(12) United States Patent
Chowdhury et al.

(10) Patent No.: US 10,951,317 B2
(45) Date of Patent: Mar. 16, 2021

(54) MULTI-LAYER VIRTUAL NETWORK EMBEDDING

(71) Applicants: Shihabur Rahman Chowdhury, Waterloo (CA); Reaz Ahmed, Waterloo (CA); Jeebak Mitra, Ottawa (CA); Nashid Shahriar, Waterloo (CA); Raouf Boutaba, Waterloo (CA); Sara Ayoubi, Waterloo (CA)

(72) Inventors: Shihabur Rahman Chowdhury, Waterloo (CA); Reaz Ahmed, Waterloo (CA); Jeebak Mitra, Ottawa (CA); Nashid Shahriar, Waterloo (CA); Raouf Boutaba, Waterloo (CA); Sara Ayoubi, Waterloo (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 260 days.

(21) Appl. No.: 15/815,871

(22) Filed: Nov. 17, 2017

(65) Prior Publication Data

US 2019/0028201 A1 Jan. 24, 2019

Related U.S. Application Data

(60) Provisional application No. 62/535,084, filed on Jul. 20, 2017.

(51) Int. Cl.
*G06F 13/00* (2006.01)
*H04B 10/27* (2013.01)
(Continued)

(52) U.S. Cl.
CPC ........... *H04B 10/271* (2013.01); *H04L 41/12* (2013.01); *H04L 41/145* (2013.01); *H04L 45/64* (2013.01);
(Continued)

(58) Field of Classification Search
CPC ......... H04L 45/64; H04L 47/78; H04L 41/12; H04L 41/145; H04B 10/271; H04J 14/02; H04Q 2011/0086
(Continued)

(56) References Cited

U.S. PATENT DOCUMENTS 9,451,342 B2 * 9/2016 Han .................. H04Q 11/0066
9,602,387 B2 * 3/2017 Wood ...................... H04L 45/02
(Continued)

FOREIGN PATENT DOCUMENTS

WO 2007039757 A2 4/2007

OTHER PUBLICATIONS

Md Mashrur Alam Khan et al. SiMPLE: Survivability in multi-path link embedding. 2015 11th International Conference on Network and Service Management (CNSM).pp. 210-218.
(Continued)

*Primary Examiner* — Kenneth R Coulter

(57) ABSTRACT

Some aspects and embodiments of the present invention provide effective mechanisms for provisioning virtual networks on communication networks. In particular some aspects and embodiments provide an effective mechanism for embedding a virtual network into a multi-layered substrate network which utilizes a different communication technology at each layer. One such example is an IP network overlaid over an optical network, such as an OTN network. Embodiments jointly determine the assignment of virtual nodes and virtual links. Assigning the nodes and links together can provide for a more optimal solution than assigning the nodes and the links separately. Some embodiments generate a collapsed graph which includes the optical network and the IP network in a single layer. Accordingly some embodiments jointly determine the assignment of virtual nodes and virtual links within such a collapsed graph,
(Continued)

which can provide more optimal assignments than considering assignments within each layer separately. In some embodiments, generating a collapsed graph includes allocating residual capacity to each link of the collapsed graph; and allocating a cost for each link of the collapsed graph. In some embodiments, allocating a cost for each link includes allocating a higher cost to optical links than to IP links. In some cases, allocating the higher costs can discourage the creation of new links unless they are needed or are beneficial (e.g. creating new links improves the overall cost/efficiency). Some embodiments utilize a heuristic method for solving an optimization function for the placement of virtual nodes and links.

24 Claims, 14 Drawing Sheets

(51) Int. Cl.
- *H04L 12/24* (2006.01)
- *H04L 12/715* (2013.01)
- *H04L 12/911* (2013.01)
- *H04J 14/02* (2006.01)
- *H04Q 11/00* (2006.01)

(52) U.S. Cl.
CPC .............. *H04L 47/78* (2013.01); *H04J 14/02* (2013.01); *H04Q 2011/0086* (2013.01)

(58) Field of Classification Search
USPC ........ 709/249, 227–229, 220–222, 230, 225, 709/226, 224, 248
See application file for complete search history.

(56) References Cited

U.S. PATENT DOCUMENTS

| | | | | |
|---|---|---|---|---|
| 9,780,909 B2* | 10/2017 | Wood | ................... | H04J 14/0286 |
| 9,949,003 B2* | 4/2018 | Rajan | ................. | H04Q 11/0062 |
| 10,257,088 B2* | 4/2019 | Izhak-Ratzin | ...... | H04L 41/0896 |
| 10,511,526 B2* | 12/2019 | Chiba | ..................... | H04L 45/74 |
| 10,541,888 B2* | 1/2020 | Chiba | ................. | H04L 41/5054 |
| 2015/0373434 A1* | 12/2015 | Han | ................... | H04Q 11/0066 398/5 |
| 2016/0191194 A1* | 6/2016 | Wood | .................. | H04J 14/0286 398/58 |
| 2016/0191370 A1* | 6/2016 | Wood | ..................... | H04L 45/02 370/238 |
| 2017/0208377 A1* | 7/2017 | Rajan | ................. | H04Q 11/0062 |
| 2017/0302572 A1* | 10/2017 | Izhak-Ratzin | ...... | H04L 41/0896 |
| 2018/0083847 A1* | 3/2018 | Chiba | ................. | H04L 41/5054 |
| 2018/0115485 A1* | 4/2018 | Chiba | ..................... | H04L 45/64 |

OTHER PUBLICATIONS

Carlos Galdamez et al. Cost-efficient virtual network function chaining over NFV-based telecommunications networks. IEEE International Conference on Advanced Networks and Telecommunications Systems (ANTS) . Jun. 2018. 6 pages.

J. Zhang et al., "Dyanmic Virtual Network Embedding over MultiLayer Optical Networks", Journal of Optical Network, Optical Soc. of America, (Sep. 2015).

M. Savi et al., "Benefits of multi-layer application-aware resource allocation and optimization", In proceedings of European Conference on Networks and Communications (EuCNC), Jun. 2017.

Li et al., Multi-layer service function chaining scheduling based on auxiliary graph in IP over optical network, in proceedings of Applied Optics and Photonics China (AOPC2017), Jun. 2017.

International Search Report dated Aug. 17, 2017 for corresponding International Application No. PCT/CN2017/088838 filed Jun. 16, 2017.

3GPP 3GPP TR 23.99 VO.5.0 3rd Generation Partnership Project; Technical Specification Group Services and System Aspects; Study on Architecture for Next Generation System (Release 14) Jun. 8, 2016.

Nokia et al. 3GPP SA WG2 Meeting #115 S2-162507 New Solution; Session Management to Enable (Re-)selection of Efficient User plane path May 17, 2016.

Huawei et al. 3GPP TSG-RAN2 Meeting 394 R2-164130 Support for ultra-reliable low latency communication (URLLC) May 13, 2016.

\* cited by examiner

MULTI-LAYER VIRTUAL NETWORK EMBEDDING

CROSS-REFERENCE TO RELATED APPLICATION

This application claims priority to U.S. Provisional Patent Application No. 62/535,084 entitled "MULTI-LAYER VIRTUAL NETWORK EMBEDDING" filed Jul. 20, 2017, the entire contents of which are incorporated herein by reference.

FIELD OF THE INVENTION

The present invention generally pertains to the field of communication networks and particular embodiments or aspects relate to allocation of network resources to virtual networks.

BACKGROUND

Communication Networks typically include different layers of networking functions consistent with the Open Systems Interconnection model (OSI model). Often each layer is separately provisioned and managed. Increasingly, an Internet Protocol (IP) network is overlaid upon a substrate network to form a multi-layer substrate network. Typically the substrate network includes both the data link layer (e.g., Ethernet, Optical Transport Network (OTN etc.) and the physical layer (copper, wireless, optical).

A multi-layer networking model that includes an optical layer for physical communication and has overlaid IP network on top is increasingly being adopted for backbone networks for both regional or long haul networks as well as for data center networks. Such multi-layer substrate networks are widely deployed as they offer flexibility of IP networks in addressing resource allocation, and traffic engineering along with the high capacity provided by optical networks. Examples of optical networks include DWDM, OTN (including OTN over DWDM) and SONET (including SONET over DWDM). Accordingly, some examples of multi-layer substrate networks include IP-over-DWDM network or an IP-over-OTN network whereby logical IP nodes are mapped onto physical nodes of the OTN or DWDM layer respectively.

Virtualization of network resources is an effective way of efficiently utilizing various network resources that host multiple client networks without being encumbered with the implementation details of underlying networks. Network virtualization (NV) has evolved as a key enabling technology for offering the next generation of network services. NV creates an abstracted version of the physical resources such as bandwidth and computing power so that a more granular demand on the overall available resources can be accommodated. NV also allows the use of resource segmentation and aggregation of a shared pool of network resources to dynamically embed the VNs into a multi-layer substrate network in a flexible and scalable manner. However, NV is typically implemented over single layer networks based on either a logical network such as an Internet Protocol (IP) network or in some cases on a physical network such as optical networks. With increasing deployments of multi-layer IP-over-Optical networks, there is a need for methods and systems which allow for the efficient utilization of NV over multi-layer substrate networks.

A virtual network includes virtual nodes and virtual links. A virtual node (VNode) is an abstraction of a physical node that may act as a data source or sink. A virtual link (VLink) connects Vnodes.

For example, there is a need for efficient Virtual Network Embedding (VNE) with typical objectives including minimizing resource provisioning cost, or maximizing the number of admitted virtual networks (VNs). The topological flexibility provided by multi-layer networks poses unique challenges for VNE. Accordingly there is a need for efficient solutions customized to such network architectures.

SUMMARY

Some aspects and embodiments of the present invention provide effective mechanisms for provisioning virtual networks on communication networks. In particular some aspects and embodiments provide an effective mechanism for embedding a virtual network into a multi-layered substrate network which utilizes a different communication technology at each layer. One such example is an IP network overlaid over an optical network, such as an OTN network. Embodiments jointly determine the assignment of virtual nodes and virtual links. Assigning the nodes and links together can provide for a more optimal solution than assigning the nodes and the links separately. Some embodiments generate a collapsed graph which includes the optical network and the IP network in a single layer. Accordingly some embodiments jointly determine the assignment of virtual nodes and virtual links within such a collapsed graph, which can provide more optimal assignments than considering assignments within each layer separately.

An aspect of the disclosure provides a method of embedding a virtual network onto a multi-layer substrate network. Such a method includes jointly determining the embedding of virtual nodes and virtual links. This can be done by formulating an objective function which considers the cost of the embedding the virtual nodes and the virtual links. Such a method further includes provisioning each virtual node on network nodes in the multi-layer substrate network, and provisioning the virtual links onto network links in the multi-layer substrate network. In some embodiments, the multi-layered substrate network includes an IP network overlaying an optical network. In some embodiments, provisioning virtual links includes mapping virtual links onto IP network links. In some embodiments, jointly determining includes creating a new IP network link. In some embodiments, provisioning virtual links includes mapping a virtual link to the new IP network link. In some embodiments, the method further includes generating a collapsed graph which includes the optical network and the IP network in a single layer. In some embodiments, generating a collapsed graph includes allocating residual capacity to each link of the collapsed graph; and allocating a cost for each link of the collapsed graph. In some embodiments, allocating a cost for each link includes allocating a higher cost to optical links than to IP links. In some cases, allocating the higher costs can discourage the creation of new links unless they are needed or are beneficial (e.g. creating new links improves the overall cost/efficiency). In some embodiments, jointly determining includes mapping each virtual node to an IP node in the IP network according to location constraints associated with each virtual node; mapping each virtual link to an IP link in the IP network, wherein the IP link can be newly created IP link; and mapping newly created IP links to paths in the optical network. In some embodiments, jointly determining further includes formulating an objective function which minimizes the cost of allocating bandwidth for mapping virtual links to IP links; and mapping new IP links to optical paths. In some embodiments jointly determining further includes formulating an objective function:

$$\sum_{\forall (u',v') \in V'^2} \sum_{i=1}^{P_{u'}} \sum_{\forall (u^*,v^*) \in E^*} z_{u^*v^*}^{u'v'i} \times b_{u'v'i} \times C_{u^*v^*} +$$

$$\sum_{\forall (u'',v'') \in E''} \sum_{\forall (u',v') \in V'^2} \sum_{i=1}^{P_{u'}} x_{u''v'i'}^{u''v''} \times b_{u''v''} \times C_{u'v'i}$$

wherein:
V" and E" are the set of virtual nodes (VNodes) and virtual links (VLinks), respectively. Each VLink (u", v")∈E" has a bandwidth requirement $b_{u''v''}$;
each VNode u"∈V" has a location constraint set Ł(u")⊂V' that represents the set of IP nodes where u" can be embedded;
the bandwidth of an IP link is represented by $b_{u'v'i}$;
mapping between a newly created IP link and an OTN link is $z_{u^*v^*}^{u'v'i}$;
mapping between a VLink (u",v")∈E" and an IP link (u', v', i)∈E' is $x_{u'v'i}^{u''v''}$; and
mapping of each VNode u"∈V" to an IP node is u'∈V'; and C represents the cost of allocating 1 unit of bandwidth from a link.

In some embodiments, the method further includes minimizing the objective function. In some embodiments, minimizing the objective function includes using integer linear programming. In some embodiments, the method further includes using a heuristic method to obtain a solution for the objective function. In some embodiments, the heuristic method includes transforming the collapsed graph into a flow network and computing min-max flow by using a min-cost max flow algorithm. In some embodiment the heuristic method includes transforming the collapsed graph into a flow network and determining a collection of flows to use for the flow network by using a min-cost max flow algorithm. In some embodiments, transforming the multilayer network into flow network includes:

Extracting a star shaped sub-graph for each VN node in the VN network;
Replacing all links with two directed links that only allow traffic to flow in one direction;
For each star shaped sub-graph, randomly assigning an IP node as the center node based on location constraints; and
Adding a meta-node for each virtual node that connects to each of the nodes in the location constraint set of a virtual node; and
Setting the capacity of the directed links that are not connected to any meta node.

In some embodiments setting the capacity of the directed links that are not connected to any meta-node includes setting the capacity according to $$\frac{b_{uv}}{\max_{\{\text{links in star}\}}(b_{u''v''})};$$

wherein the bandwidth of an IP link is represented by $b_{u'v'i}$.

In some embodiments the method further includes adding a dummy sink node, and connecting the meta-nodes to the dummy sink node. In some embodiments, the method includes the addition of Referee-nodes to ensure only one IP node is connected to exactly one meta-node. In some embodiments, the method further includes setting the capacity of links connected to meta-nodes and Referee-nodes to 1. In some embodiments the step of computing min-max flow by using a min-cost max flow algorithm includes the execution of the Edmonds-Karp algorithm to compute minimum-cost maximum-flow on the transformed flow network. In some embodiments the step of determining a collection of flows to use for the flow network by using a min-cost max flow algorithm includes the execution of the Edmonds-Karp algorithm to compute minimum-cost maximum-flow on the transformed flow network. In some embodiments, method further includes the conversion of flow augmenting paths into embedded virtual links; and the conversion of flow termination nodes into embedded virtual nodes. In some embodiments, the method includes repeating the steps for each sub-graph until no unmapped star subgraph exists in the virtual network. In some embodiments jointly determining further includes formulating an objective function which minimizes the cost of mapping virtual links to IP network links. In some embodiments jointly determining further includes formulating an objective function which can be used to minimize the cost of mapping virtual links to IP network links, and mapping any newly added IP network links to optical paths in the network. In some embodiments jointly determining further includes formulating an objective function which can be used to minimize the cost of: mapping each virtual node to an IP node in the IP network according to location constraints associated with each virtual node; mapping each virtual link to an IP link in the IP network, wherein the IP link can be a newly created IP link; and mapping any newly created IP links to optical paths in the network. In some embodiments transforming the collapsed graph into a flow network includes extracting a star shaped sub-graph for each VN node in the VN network; and replacing all links with two directed links that allow traffic to flow in one direction. In some embodiments, the method further includes, for each star shaped sub-graph, randomly assigning an IP node as the center node based on location constraints; adding a meta-node for each virtual node that connects to each of the nodes in the location constraint set of a virtual node; and setting the capacity of the directed links that are not connected to any meta-node.

Other aspects include network controller configured to implement the methods discussed herein. For example, one aspect provides network controller including a network interface, a processor, and machine readable memory storing machine executable instructions. The machine executable instructions, when executed by the processor, causes the network controller to: jointly determine the embedding of virtual nodes and virtual links by formulating an objective function which considers the cost of the embedding the virtual nodes and the virtual links; provision each virtual node on network nodes in the multi-layer substrate network; and provision virtual links onto network links in the multi-layer substrate network. In some embodiments the multi-layered substrate network includes an IP network overlaying an optical network and the instructions which cause the network controller to provision virtual links includes instructions to map virtual links onto IP network links. In some embodiments the instructions which cause the network controller to jointly determine further includes instructions to cause the network controller to formulating an objective function which can be used for minimizing the cost of: mapping each virtual node to an IP network node in the IP network according to location constraints associated with each virtual node; mapping each virtual link to an IP network link in the IP network, wherein the IP link can be a newly created IP network link; and mapping any newly created IP network links to optical paths in the network.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

DETAILED DESCRIPTION

Figure 1:
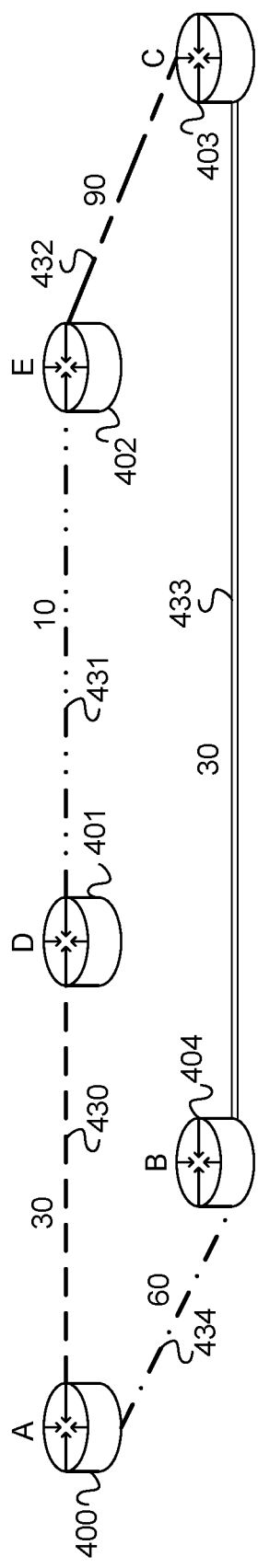
FIG. 1 illustrates an IP substrate network.

Aspects of the disclosure are directed to methods and systems for embedding a virtual network onto a multi-layered substrate network. A substrate network includes the physical nodes of the network and links that provide connectivity between these nodes and carry traffic. A multi-layered substrate network is a network wherein network resources are provisioned on a layered network architecture such as that in an IP-over-DWDM network or an IP-over-OTN network whereby logical IP nodes are mapped onto physical nodes of the OTN or DWDM layer respectively. In this disclosure, embodiments will be discussed using an example multi-layered substrate network which includes an IP network overlaid upon an optical network. In such an example, IP nodes communicate using the IP protocol over IP links. The optical network utilizes optical signals to physically carry the IP traffic between nodes of the optical network.

Several deployment models exist for multi-layer IP-over-Optical networks including, but not limited to IP over Dense Wavelength Division Multiplexing (DWDM) network; IP over Optical Transport Network (OTN) over DWDM network. DWDM networks may have constraints such as wavelength continuity for optical circuits and typically do not have transparent traffic grooming capabilities. From a network flexibility perspective, a more favorable choice is to deploy an OTN over DWDM network with advanced transport capabilities (for example traffic grooming without optical-electrical-optical conversion). The OTN in turn can be static which means that the necessary interfaces on the OTN nodes have been configured and the corresponding light paths in the DWDM layer have been lit to provision fixed bandwidth between OTN nodes. Or, the OTN can be dynamic which means that more bandwidth between OTN nodes can be provisioned by lighting new light paths in the DWDM.

Example embodiments will be discussed herein with respect to examples using an IP over OTN multi-layered substrate network.

In an embodiment, VNE for multi-layer networks is based on a static OTN. In some embodiments, although the OTN is relatively static, the IP network is dynamic in that new links can be established when needed by provisioning necessary capacity from the OTN. Such flexibility can be exploited if residual resources in the IP layer are insufficient to admit a new VN. Further, in some embodiments, such flexibility can be used to reduce the cost of embedding VNs by creating new IP links. Provisioning new IP links in optical networks has been a tedious and manual task with a long turnaround time. However, with the advances in optical networking technologies and centralized optical control plane, such provisioning tasks are becoming automated. Even then, establishing new IP links can be more expensive than embedding virtual links on existing IP links. In this embodiment, IP nodes are connected to some OTN nodes and IP links can be provisioned by allocating the necessary bandwidth from the underlying OTN paths. Some embodiments address the following challenges:

a. embedding a VN with a minimum resource provisioning cost on a flexible IP layer;

b. minimizing the creation of new IP links for embedding a VN request and c. minimizing the cost associated with creating new IP links.

Some embodiments address the following challenges:

(i) strike a balance between obtaining a low cost VN embedding while minimizing the establishment of new IP links; and (ii) simultaneously decide on whether to create an IP link or not and its embedding in the OTN.

An embodiment that jointly optimizes IP link creation and their embedding is one solution that meets these challenges.

Such an embodiment can be advantageous as in some cases, separately considering IP link creation and their embedding on the OTN can lead to suboptimal solutions.

FIG. 1 illustrates an example of an IP substrate network. The IP network illustrated shows IP node A (node 400) connected to IP node B (node 404) via IP link 434. IP link 434 is illustrated with a residual capacity of 60. Residual capacity of a link is computed by subtracting from the link's total capacity the capacity consumed by virtual links already mapped to it. For example, if an IP link has a capacity of 100 Mbps and a 70 Mbps virtual link is routed through that IP link, the residual capacity of this IP link is 30 Mbps. IP node A also connected to IP node D (node 401) via IP link 430. IP link 430 has a residual capacity of 30. IP node D is connected to IP node E (node 402) via IP link 431 (with residual capacity of 10). IP node E is connected to IP node C (node 403) via IP link 432 (with residual capacity of 90). IP node C is connected to IP node B via IP link 433 (with residual capacity 30).

Figure 2:
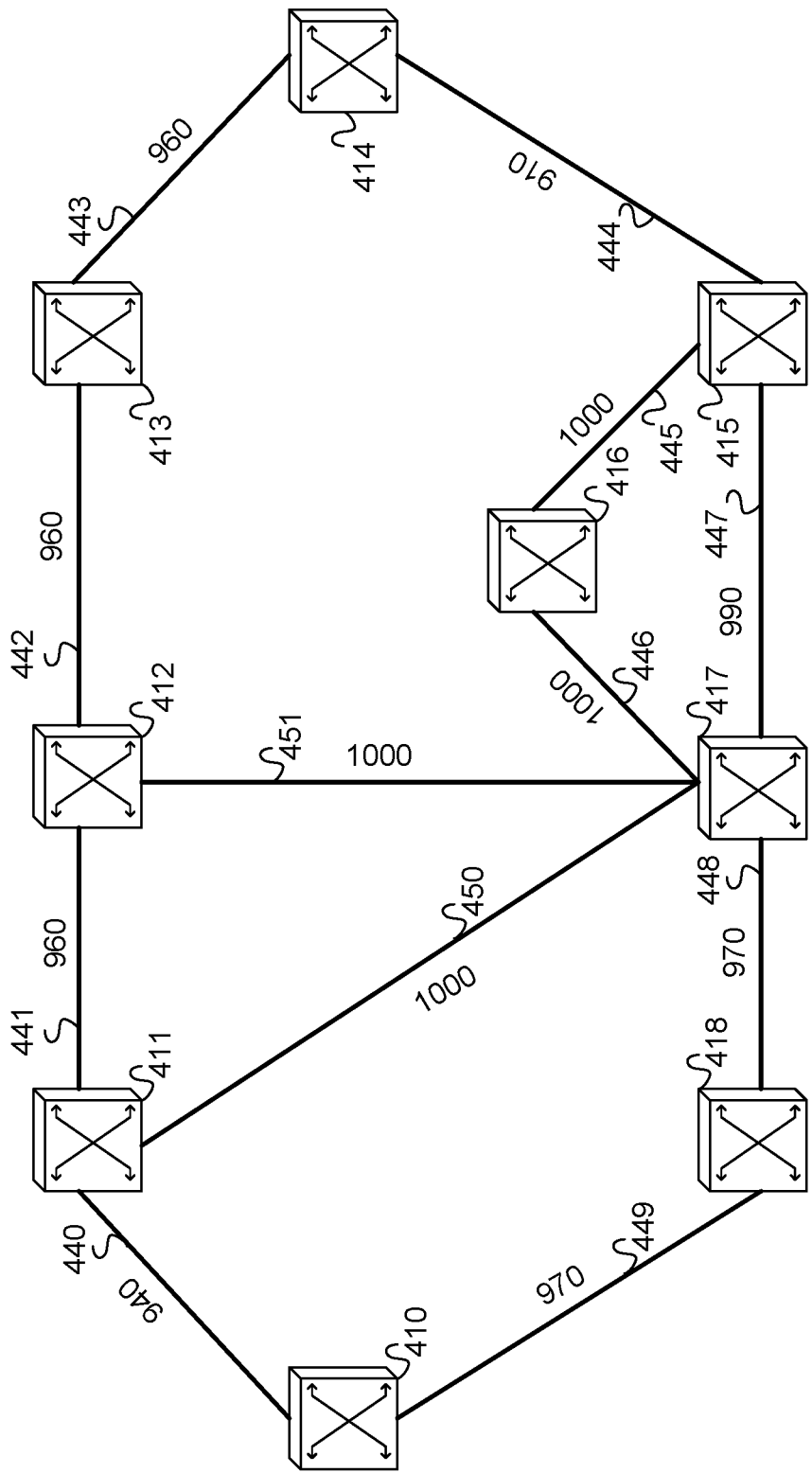
FIG. 2 illustrates an OTN substrate network.

FIG. 2 illustrates an embodiment of the Optical network (in this embodiment an OTN). The OTN network illustrated shows OTN node 410 connected to OTN node 411 via OTN link 440 (with residual capacity 940). OTN node 411 is connected to OTN node 412 via OTN link 441 and also to OTN node 417 via OTN link 450. OTN link 441 is shown as having a residual capacity of 960 and OTN link 450 is shown as having a residual capacity 1000. OTN node 412 is connected to OTN node 413 via OTN link 442 and also to OTN node 417 via OTN link 451. OTN link 442 is shown as having a residual capacity 960 and OTN link 451 with residual capacity 1000. OTN node 413 is connected to OTN node 414 via OTN link 443 (with residual capacity 960). OTN node 414 is connected to OTN node 415 via OTN link 444 (with residual capacity 910). OTN node 415 is connected to OTN node 417 via OTN link 447 and also to OTN node 416 via OTN link 445. OTN link 445 is shown as having a residual capacity of 1000 and OTN link 447 with residual capacity 990. OTN node 416 is connected to OTN node 417 via OTN link 446 (with residual capacity 1000). OTN node 417 is connected to OTN node 418 via OTN link 448 (with residual capacity 970). OTN node 418 is connected to OTN node 410 via OTN link 449 (with residual capacity 970).

The substrate OTN can be represented in an embodiment as an undirected graph $G^*=(V^*, E^*)$, where $V^*$ and $E^*$ are the set of Optical Cross Connects (OXCs) (referred to as OTN nodes from here on) and OTN links respectively. Neighbours of an OTN node $u^* \in V^*$ are represented with $\mathcal{N}(u^*)$. The OTN in an embodiment is fixed when the light paths atop a DWDM layer have already been lit to provision OTN links $(u^*, v^*) \in E^*$ with bandwidth capacity $v_{u^* v^*}$. This pre-provisioned bandwidth can be used to establish IP links between IP routers. In an embodiment the cost of allocating one unit of bandwidth from an OTN link $(u^*, v^*) \in E^*$ is defined by $C_{u^*, v^*}$.

The substrate IP network can be represented in an embodiment as an undirected graph $G'=(V', E')$. Each IP node $u' \in V'$ has $p_{u'}$ number of ports with homogeneous capacity $cap_{u'}$. An IP node is connected to an OTN node through a short-reach wavelength interface. The attachment between an IP and an OTN node can be represented using a binary input variable $\tau_{u', u^*}$, which is set to 1 only when IP node u' is attached to OTN node $u^*$. An IP link is provisioned by establishing an OTN path that connects its end points. In some embodiments multiple IP links between a pair of IP nodes can be established and their capacities bundled using some form of link aggregation protocol. The i-th IP link between u' and v' where $1 \leq i \leq p_{u'}$, is represented by (u',v',i). The bandwidth of an IP link is represented by $b_{u', v', i}$. Capacity of an IP link (u',v',i) is set to min ($cap_{u'}, cap_{v'}$).

Figure 3:
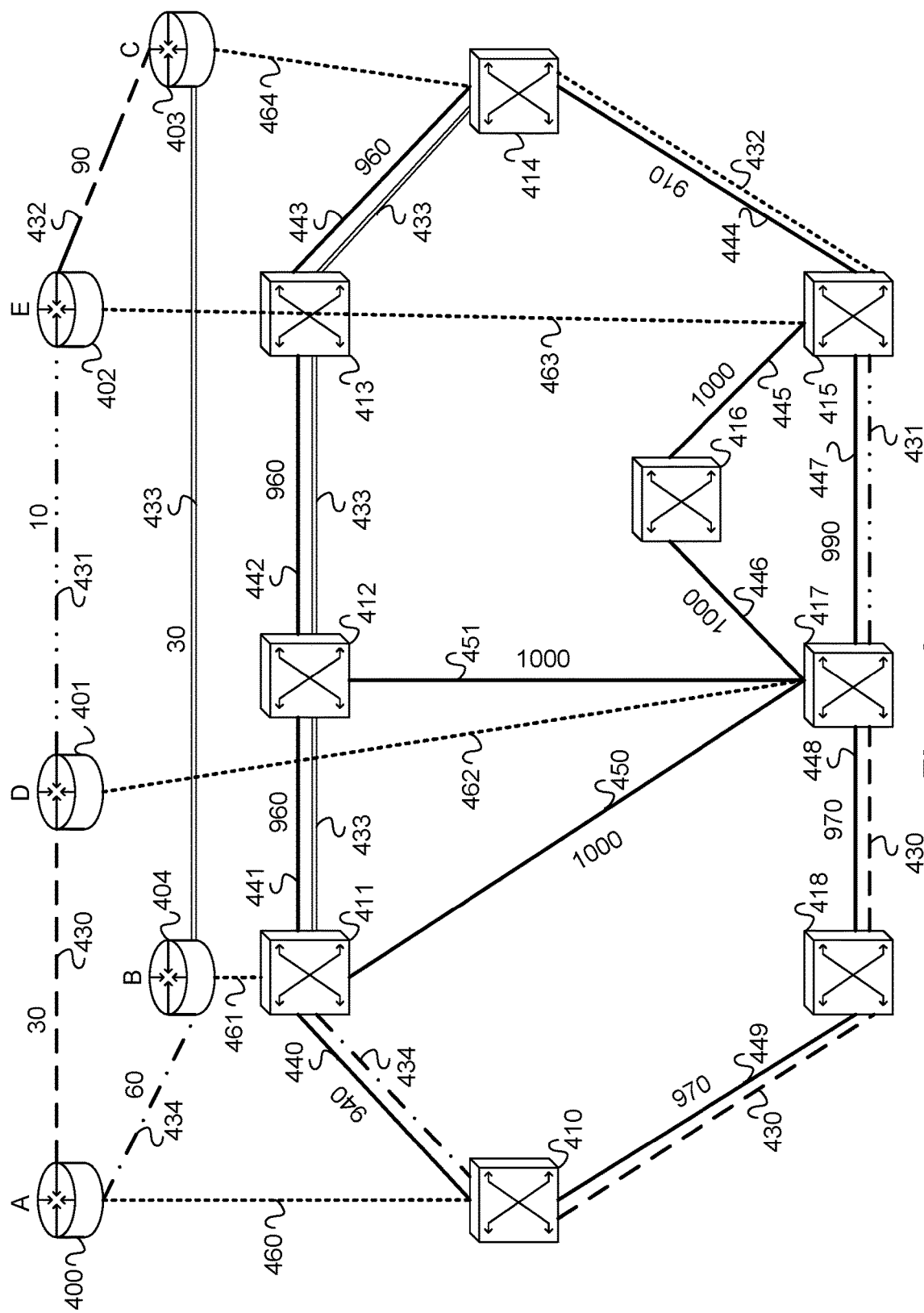
FIG. 3 illustrates a mapping between the IP network's nodes and the OTN network's nodes.

FIG. 3 illustrates an embodiment of multi-layered substrate network including the IP network of FIG. 1 overlaid upon the OTN network of FIG. 2. The numerical values associated with each link represent the link's residual capacity. For example, link 430's capacity is 30, link 451's capacity is 1000, and link 445's capacity is 1000. In FIG. 3 each IP link of the IP network is mapped on an OTN path. This is illustrated by overlaying the line styles of the IP links of FIG. 1 onto the optical paths of FIG. 2. It is noted that an IP link can extend over multiple optical links. For example, link 430 extends over optical links 448 and 449. The cost of allocating one unit of bandwidth from an IP link $(u',v',i) \in E'$ is $C_{u',v',i}$.

Figure 4:
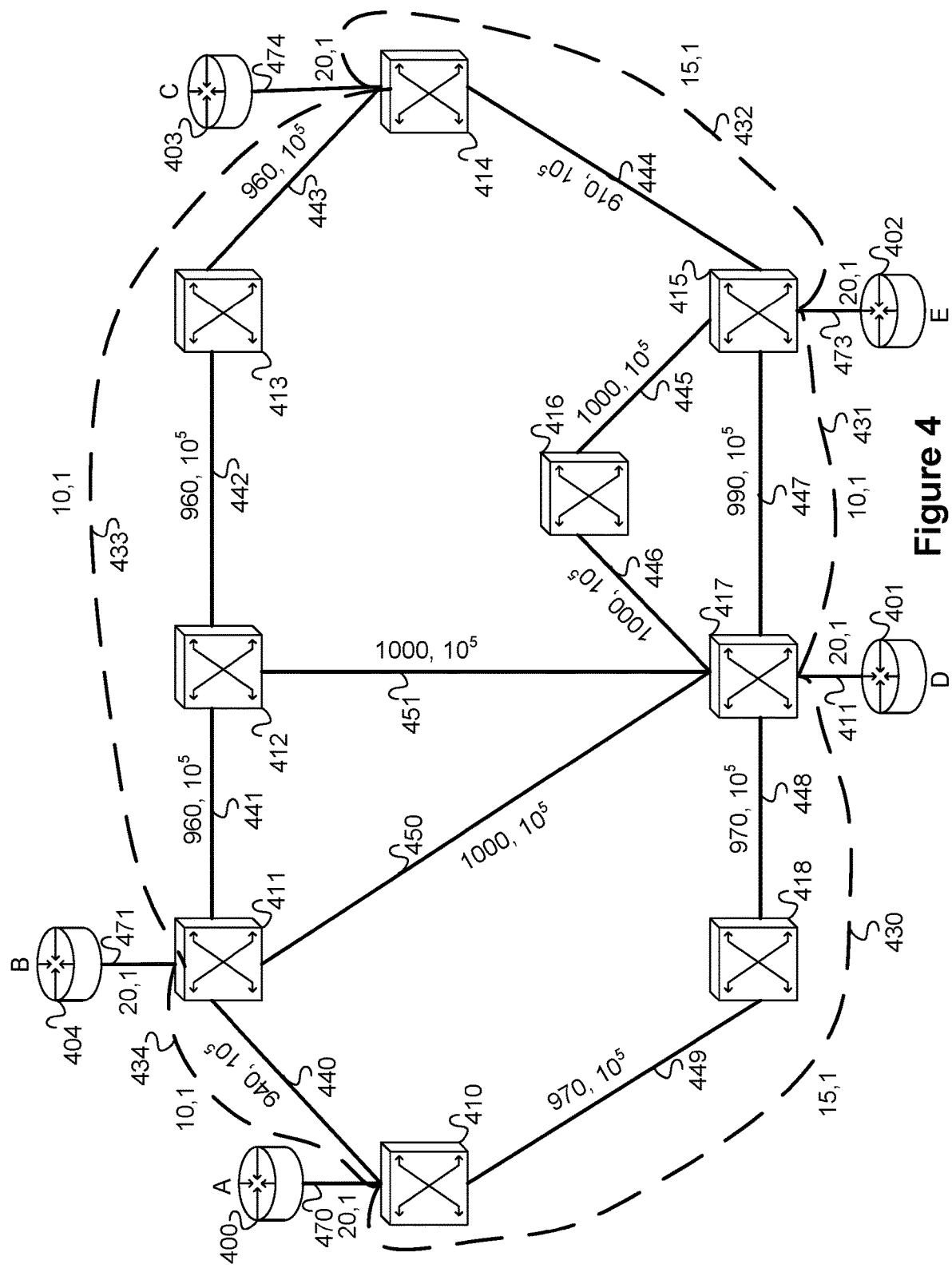
FIG. 4 illustrates a collapsed graph that is created when mapping nodes and links in the IP network to nodes and links in the OTN network, according to an embodiment.

FIG. 4 illustrates an embodiment where the IP-over-OTN network of FIG. 3 has been converted into a collapsed IP-OTN graph. The collapsed graph includes the OTN nodes, OTN links, IP Nodes, and IP-OTN links. The solid lines in FIG. 4 represent IP-OTN links and are labeled 470, 440, 471, 450, 441, 451, 442, 443, 474, 444, 473, 445, 447, 411, 446, 448, and 449. The dashed lines in FIG. 4 represent IP links and are labeled 434, 433, 432, 431, and 430. The IP links are represented by direct links between the OTN nodes incident to the endpoints of each IP link. For example, IP node D 401 is connected to OTN node 417. IP node A 400 is connected to OTN node 410. IP link 430 between IP node D 401 and IP node A 400 traverses OTN nodes 410, 418 and 417.

Figure 5:
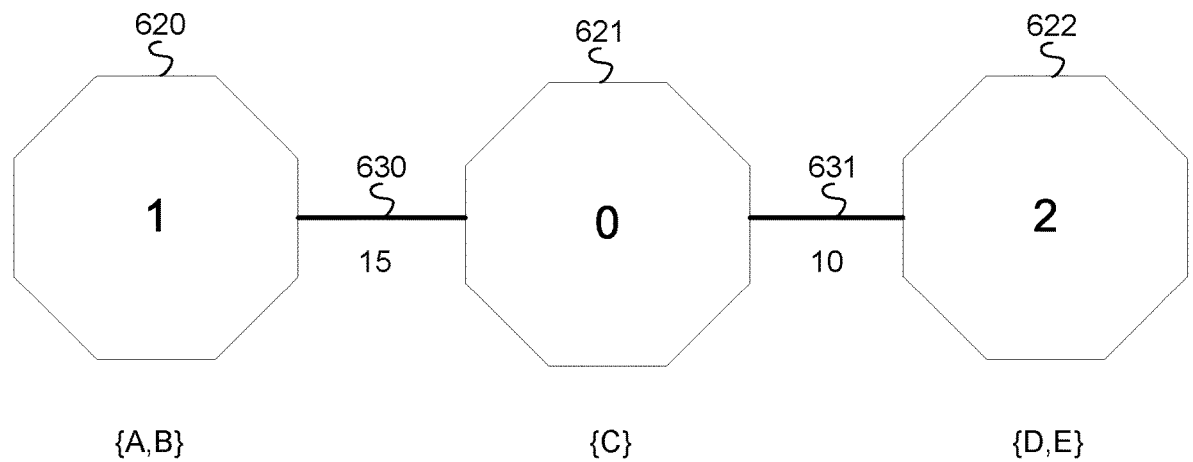
FIG. 5 illustrates the nodes and connections of a Virtual Network, according to an embodiment.

A VN request is an undirected graph $G''=(V'', E'')$, where V'' and E'' are the set of virtual nodes (VNodes) and virtual links (VLinks), respectively. Each VLink $(u'', v'') \in E''$ has a bandwidth requirement $b_{u'', v''}$. Each VNode $u'' \in V''$ has a location constraint set $\mathcal{L}_{u''} \subset V'$ that represents the set of IP nodes where u'' can be embedded. The location constraint can be represented using the binary input variable $\mathcal{L}_{u'', u'}$, which is set to 1 if IP node $u' \in \mathcal{L}(u'')$. FIG. 5 illustrates a VN, where the number of each link represents VLink bandwidth requirement (also referred to as demand), and the set beneath each node denotes that VNode's location constraints. Accordingly, in the example illustrated, the VN request includes a center node (node 0) 621, which is constrained to be located at node C. Node 621 is requested to have connectivity to adjacent node 620 (node 1), which is constrained to be at either node A or Node B, and adjacent node 622 (node 2), which is constrained to be at either node D or Node E. Link 620 has a Vlink requirement (demand) of 15 and Link 631 has a Vlink requirement (demand) of 10

An example embodiment will be discussed in which a multi-layer SN includes an IP network G' overlaid on top of an OTN network $G^*$. In such an embodiment a method of embedding VN request G'' with location constraint set $\mathcal{L}$ includes:

a. Mapping of each VNode $u'' \in V''$ to an IP node $u' \in V'$ according to the VNode's location constraint.
b. Mapping of each VLink $(u'',v'') \in E''$ to a path in the IP network. This path can contain a combination of existing IP links and newly created IP links.
c. Mapping of all newly created IP links to a path in the OTN.
d. Minimizing the total cost of provisioning resources for VLinks and the cost of provisioning resources for new IP links subject to the following constraints:
   i. IP links cannot be over-committed to accommodate the VLinks, and ii. the demand of a single VLink should be satisfied by a single IP path.

An embodiment that implements an optimal solution can be formulated as an objective function solved using integer linear programming (ILP). The decision variables, constraints, objective function, of such an optimal solution are described in the next four paragraphs, according to an embodiment.

An embodiment that implements this optimal solution using ILP formulation may have the following decision variables. The following decision variables indicate the mapping between a VLink $(u'',v'') \in E''$ and an IP link, $(u',v',i) \in E'$.

$$x_{u'v'i'}^{u''v''} = \begin{cases} 1 & \text{if}(u'',v'') \in E'' \text{ is mapped to } (u',v',i) \in E', \\ 0 & \text{otherwise.} \end{cases}$$

The following decision variable denotes the mapping between VNodes and IP nodes:

$$y_{u''u'} = \begin{cases} 1 & \text{if } u'' \in V'' \text{ is mapped to } u' \in V', \\ 0 & \text{otherwise.} \end{cases}$$

Creation of new IP links is decided by:

$$\gamma_{u'v'i} = \begin{cases} 1 & \text{when } i\text{-th IP link is created between } u' \text{ and } v', \\ 0 & \text{otherwise.} \end{cases}$$

When a new IP link is created it is mapped to a path in the OTN network. Mapping between a newly created IP link and an OTN link is indicated by the following variable:

$$z_{u^*v^*}^{u'v'i} = \begin{cases} 1 & \text{if}(u',v',i) \in E' \text{ is mapped to } (u^*,v^*) \in E^*, \\ 0 & \text{otherwise.} \end{cases}$$

The VNode mapping constraints are described by equations (1) and (2). These constraints ensure that each VNode is mapped to exactly one IP node according to the location constraints. Equation (3) describes the constraint that restricts multiple VNodes to be mapped on the same IP node.

$$\forall u'' \in V'', \forall u' \in V' : y_{u''u'} \le \mathscr{L}_{u''u'} \quad (1)$$

$$\forall u'' \in V'' : \sum_{u' \in V'} y_{u''u'} = 1 \quad (2)$$

$$\forall u' \in V' : \sum_{u'' \in V''} y_{u''u'} \le 1 \quad (3)$$

The VLink mapping constraints are described by equations (4), (5), (6), (7) and (8).

$$\forall (u'',v'') \in E'', \quad (4)$$
$$\forall (u',v') \in V'^2,$$
$$1 \le i \le \min(p_{u'}, p_{v'}) : x_{u'v'i}^{u''v''} \le \gamma_{u'v'i} + \gamma_{v'u'i} + \Gamma_{u'v'i}$$

$$\forall (u'',v'') \in E'' : \sum_{\forall (u',v') \in V'^2} \sum_{i=1}^{p_{u'}} x_{u'v'i}^{u''v''} \ge 1 \quad (5)$$

$$\forall (u'',v'') \in E'', \forall (u',v') \in V'^2 : \sum_{i=1}^{p_{u'}} x_{u'v'i}^{u''v''} \le 1 \quad (6)$$

$$\forall (u',v') \in V'^2, 1 \le i \le p_{u'} : \sum_{\forall (u'',v'') \in E''} x_{u'v'i}^{u''v''} \times b_{u''v''} \le b_{u'v'i} \quad (7)$$

$$\forall (u'',v'') \in E'', \quad (8)$$
$$\forall u' \in V' : \sum_{\forall v' \in N(u')} \sum_{i=1}^{\min(p_{u'}, p_{v'})} \left( x_{u'v'i}^{u''v''} - x_{v'u'i}^{u''v''} \right) = y_{u''u'} - y_{v''u'}$$

The IP Link Creation Constraints are described by equations (9) and (10). The equation for constraint (9) describes that the IP node's number of ports limits the number of incident IP links. The equation for constraint (10) describes that a specific instance of IP link between a pair of IP nodes is either decided by the ILP (i.e., is a newly added link) or was part of the input (i.e., is an existing IP link), but not both at the same time.

$$\forall u' \in V' : \sum_{\forall v' \in V' | v' \ne u'} \sum_{i=1}^{\min(p_{u'}, p_{v'})} \gamma_{u'v'i} + \gamma_{v'u'i} + \Gamma_{u'v'i} \le p_{u'} \quad (9)$$

$$\forall (u',v') \in V'^2, 1 \le i \le p_{u'} : \gamma_{u'v'i} + \Gamma_{u'v'i} \le 1 \quad (10)$$

The IP-to-OTN Link Mapping Constraints are described by equations (11), (12) and (13). Equation (11) states that only the newly created IP links are mapped on the OTN layer. Equation (12) is the flow conservation constraint that ensures continuity of the mapped OTN paths. Equation (13) describes the capacity constraint for OTN links.

$$\forall (u',v') \in V'^2, 1 \le i \le p_{u'}, (u^*,v^*) \in E^* : z_{u^*v^*}^{u'v'i} \le \gamma_{u'v'i} \quad (11)$$

$$\forall (u',v') \in V'^2, 1 \le i \le p_{u'}, \quad (12)$$
$$\forall u^* \in V^* : \sum_{\forall v^* \in N(u^*)} \left( z_{u^*v^*}^{u'v'i} - z_{v^*u^*}^{u'v'i} \right) = \begin{cases} \gamma_{u'v'i} & \text{if } \tau_{u'u^*} = 1, \\ -\gamma_{u'v'i} & \text{if } \tau_{v'u^*} = 1, \\ 0 & \text{otherwise.} \end{cases}$$

$$\forall (u^*,v^*) \in E^* : \sum_{\forall (u',v') \in V'^2} \sum_{i=1}^{p_{u'}} z_{u^*v^*}^{u'v'i} \times b_{u'v'i} \le b_{u^*v^*} \quad (13)$$

Some embodiments formulate an objective function to minimize the cost (C) of provisioning bandwidth for VLinks, which includes the cost incurred by creating new IP links, should they be added. Cost for provisioning new IP links is computed as the cost of allocating bandwidth in the OTN paths for every new IP link. The cost for embedding a VN is computed as the total cost of provisioning bandwidth on the IP links for the VLinks. The objective function is formulated as follows:

$$\text{minimize} \sum_{\forall (u',v') \in V'^2} \sum_{i=1}^{p_{u'}} \sum_{\forall (u^*,v^*) \in E^*} z_{u^*v^*}^{u'v'i} \times b_{u'v'i} \times C_{u^*v^*} + \quad (14)$$

-continued $$\sum_{\forall(u'',v'')\in E''} \sum_{\forall(u',v')\in V'^2} \sum_{i=1}^{P_{u'}} x_{u',v'}^{u'',v''} \times b_{u'',v''} \times C_{u',v'i}$$

wherein C represents the cost of allocating 1 unit of bandwidth from a link (the link can be IP link or OTN link). For example, if an IP link has a capacity of 10 Gbps, then C would represent the cost of allocating 1 Gbps bandwidth from that IP link to embed a virtual link on it.

It should be understood that equation 14 implicitly considers the cost of embedding the virtual nodes and the virtual links. For example, equation 14 considers the virtual nodes in conjunction with constraints for the placement of the virtual nodes as set out in equations 1-3. Accordingly, a system which utilizes equation 14 represents an example of jointly determining the embedding of virtual nodes and virtual links by formulating an objective function which considers the cost of the embedding the virtual nodes and the virtual links.

It is noted that this represents an NP-Hard problem. Given the NP-Hard nature of the multi-layer VNE problem and complexity for performing an exhaustive search for large network instances, some embodiments provide a heuristic solution to the Multi-Layer VNE problem. It is noted that such a heuristic method may not necessarily yield an optimal solution for all cases, but it provides an embedding of the VN which satisfies the constraints in significantly less time than an ILP solution to the objective function. Further, in some cases, the heuristic embodiment can yield the optimal solution for star VN topologies with uniform bandwidth requirements, since for such a case the Vnodes and Vlinks are embedded in conjunction with each other.

One challenge that such a heuristic resolves is the fact that the embedding can take place in both the IP and OTN layers. This situation occurs when a VN could not be accommodated by the existing IP links and requires the creation of new IP links. A plausible approach is to handle the embedding at each layer separately by first mapping the VN on the IP layer followed by mapping the new IP links on the OTN layer. Such disjoint embedding is far from optimal as there may not be sufficient bandwidth at the OTN level to accommodate the new IP links. To overcome this limitation, the embodiments consider both layers simultaneously when embedding a VN. This is achieved by collapsing the IP and OTN into a single layer graph, such as the graph illustrated in FIG. 4. This collapsed graph contains all of the IP and the OTN nodes and links, as well as the links connecting IP nodes to OTN nodes. In an embodiment, a VLink embedding that contains OTN links indicates the creation of new IP links (which can utilize OTN links which were not utilized by existing IP links). In an illustrative example, the embodiment illustrated in FIG. 4, each IP node is assumed to have one unoccupied port, hence, at most one more new IP link can be created. It is further assumed that the capacity of the IP ports is 20 units and therefore the capacity of a newly created IP link that uses this port will be 20. Each link has two numeric values separated by a comma. The value to the left of the comma represents the capacity of the link and the value to the right of the comma represents the cost of using the link. These costs are assigned as part of the step of forming the collapsed graph. In the illustrated embodiment the cost of the IP links are set to 1, and the cost of the OTN links are several orders of magnitude higher to discourage the mapping of virtual links to new links, which require routing through new OTN links. In other words, part of the step of forming a collapsed graph includes allocating a cost for each link. In some embodiments this includes allocating a higher cost to optical links than to IP links. By so doing, the creation of new IP links is discouraged (in favour of mapping virtual links to existing IP links) unless necessary or beneficial (despite the high costs) to do so. Accordingly, as existing IP links are already mapped to OTN links, such embodiments only need determine new OTN paths when new IP links are called for.

A second challenge resolved by this heuristic method is to perform simultaneous embedding of a VNode and its incident VLinks. Embedding VNodes independently of their incident VLinks increases the chances of VN embedding failure. However, such joint embedding is hard to solve since it is equivalent to solving the NP-Hard Multi-commodity Unsplittable Flow with Unknown Sources and Destinations. In order to embed VNodes along with their incident VLinks, the heuristic, modifies the collapsed graph's into a flow network. The VNode and VLink embedding problem is thus converted into a min-cost max-flow problem whereby each link in the graph is replaced by directional links in both directions. Such an instance of the max-flow problem may be solved using an optimization algorithm such as a min-cost max flow algorithm. In some embodiments an Edmonds-Karp (EK) algorithm is used. The flows returned by EK indicate both the VNode's and VLink's mapping.

Figure 6:
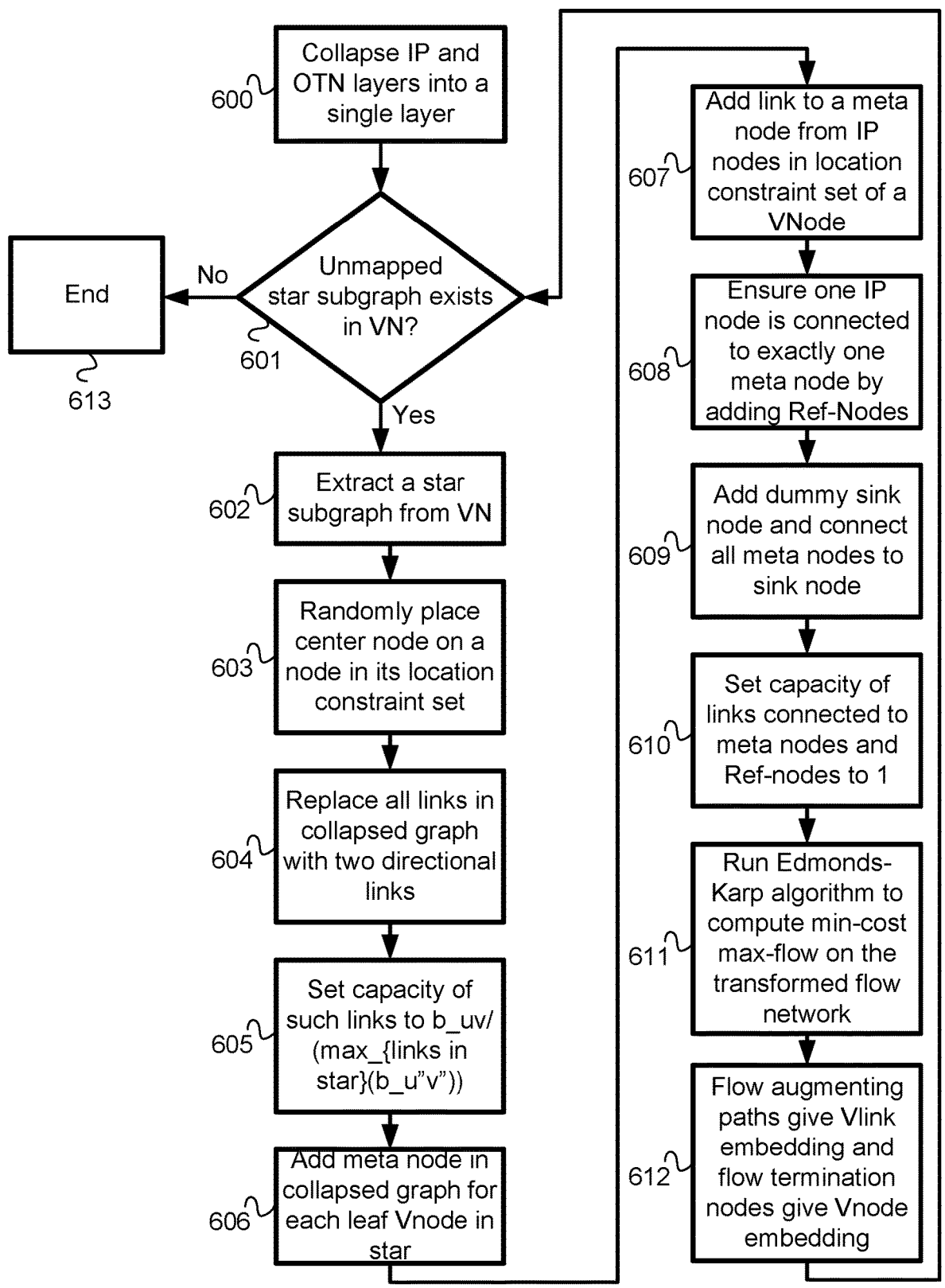
FIG. 6 is a flowchart illustrating a method of a heuristic algorithm that addresses the allocation of Network resources for Virtualization of multi-layer IP-over-Optical networks, according to an embodiment.

FIG. 6 illustrates an example flow chart of the heuristic method, according to an embodiment. The first step is to collapse the OTN and IP networks into a single-layer to achieve joint mapping onto the IP and OTN layers, as previously discussed with reference to FIG. 4. This is shown as step 600. The residual capacities of the IP and OTN links are kept as they are. It is assumed that the OTN links have significantly higher cost of allocation than the IP links. Therefore, new IP links are created only when they are really needed and can significantly reduce embedding cost. Between every IP node u' and its corresponding OTN node u*, a link, $p_{u'}$, is created with capacity $cap_{u'}$. This guarantees that at most $p_{u'}$ new IP links can be created from u', and that the capacity of these IP links cannot exceed the IP port's capacity. The heuristic next extracts star shaped sub-graphs from the VN. This is shown by processes 601, 602, 603, 604, and 605. During extraction of the star-shaped sub-graph, a VNode v"∈V" is randomly picked and embedded with its incident VLinks. Embedding v"'s incident links entails embedding its neighbours as well. This means that a star-shaped subgraph of the VN is embedded with each iteration. This process begins by mapping the center of the star to a random IP node in its location constraint set (denoted as source in the following description). A flow network is then constructed in a way that paths contributing to a min-cost max-flow in the flow network correspond to the embedding of the VLinks incident to v". A flow network is created by replacing every link in the collapsed graph with directional links in both directions. To consider the various capacity constraints at each of the layers meta-nodes are next added to form an extended flow network. A meta-node is a hypothetical node that ensures that all flows in the collapsed graph are embedded with due consideration to the location constraints. A meta-node is added ∀u"∈N(v"), in the flow network that is connected to every node in $\mathscr{L}_u(u")$. These meta-nodes are in-turn connected to a single meta-node, that is denoted as the sink. This is shown in processes 606 and 607. Furthermore, in some embodiments additional restrictions may be added to the flow capacity of each of the links to limit the maximum number of vLinks that can be embedded without overcommitting the corresponding substrate layer links. After the addition of meta-nodes, the link capacities in the flow network obtained from the transformation above are set as following:

a. The flow capacity of a link (u,v) from the collapsed graph that is not connected with any meta-node to $$\frac{b_{uv}}{\max \forall u'' \in N(v'')(b_{u''v''})}$$

605 Setting such capacity puts an upper limit on the maximum number of VLinks that can be routed through these links. This can ensure that no capacity constraints are violated.

b. The capacity of the links incident to a meta-node is set to 1 610. This guarantees that at most |N(v")| flows can be pushed from source to sink.

The location constraint sets of different VNodes in a single VN may overlap. These VNodes are denoted as "conflict nodes" and the intersection of their location constraint sets as the "conflict set". Every node in the conflict set is denoted as a conflict node. When conflicting VNodes are incident to the same start node, the collapsed graph becomes augmented where all nodes in the conflict set are connected to more than one meta-node. This is problematic because EK may end up routing multiple VLinks via the same conflict node, thereby violating the one-to-one node placement constraint. In some embodiments, the heuristic method can add Referee nodes as a next step to help with such situations. This is illustrated as processes 608, 609, 610. Referee nodes are meta-nodes that can be added to resolve the case of conflicting VNodes. In presence of a conflict, conflict nodes will be connected to more than one meta-node at the same time. Referee nodes thus break this concurrency by removing the conflicting connections, and replacing them with a single connection to a Referee node. The referee node is subsequently connected to all the meta-nodes of the conflicting nodes. This ensures that at most a single VLink will be routed through any conflict node. Further, when a conflict node is selected to host a given VNode, no other IP node for the same VNode will be selected, thereby ensuring a one-to-one assignment. The collapsed graph is now a max-flow problem that will be solved using EK. This is illustrated as processes 611 and 612. The capacity of the links in the flow network are set in a way that EK can push at most |N(v")| flows, indicating the VLink embedding of v"'s incident links. Note that the only way to push |N(v")| flows is by having each flow traverse a meta-node to reach the sink. The VNode embedding of v"'s neighbours can be extracted by examining each flow to find the incident IP node of each meta-node. If any of the obtained flows is routed via an OTN path, then a new IP link is established and added to the collapsed graph. This allows subsequent iterations to use the newly created IP link. If at any iteration EK returns less than |N(v")| flows, this indicates an embedding failure, and the algorithm terminates (illustrated by process 613). Otherwise, the algorithm returns to process 601 and iterates through the process again until all VNodes are settled. Let I be the number of iterations of the heuristic. EK is run during each iteration to find the min-cost max-flow. The augmenting path finding procedure of EK was replaced with Dijkstra's shortest path algorithm in this embodiment. Therefore, the running time of EK becomes $O(|V||E|^2 \log |V|)$. This renders the time complexity of the heuristic to $O(I|V||E|^2 \log |V|)$.

Figure 7:
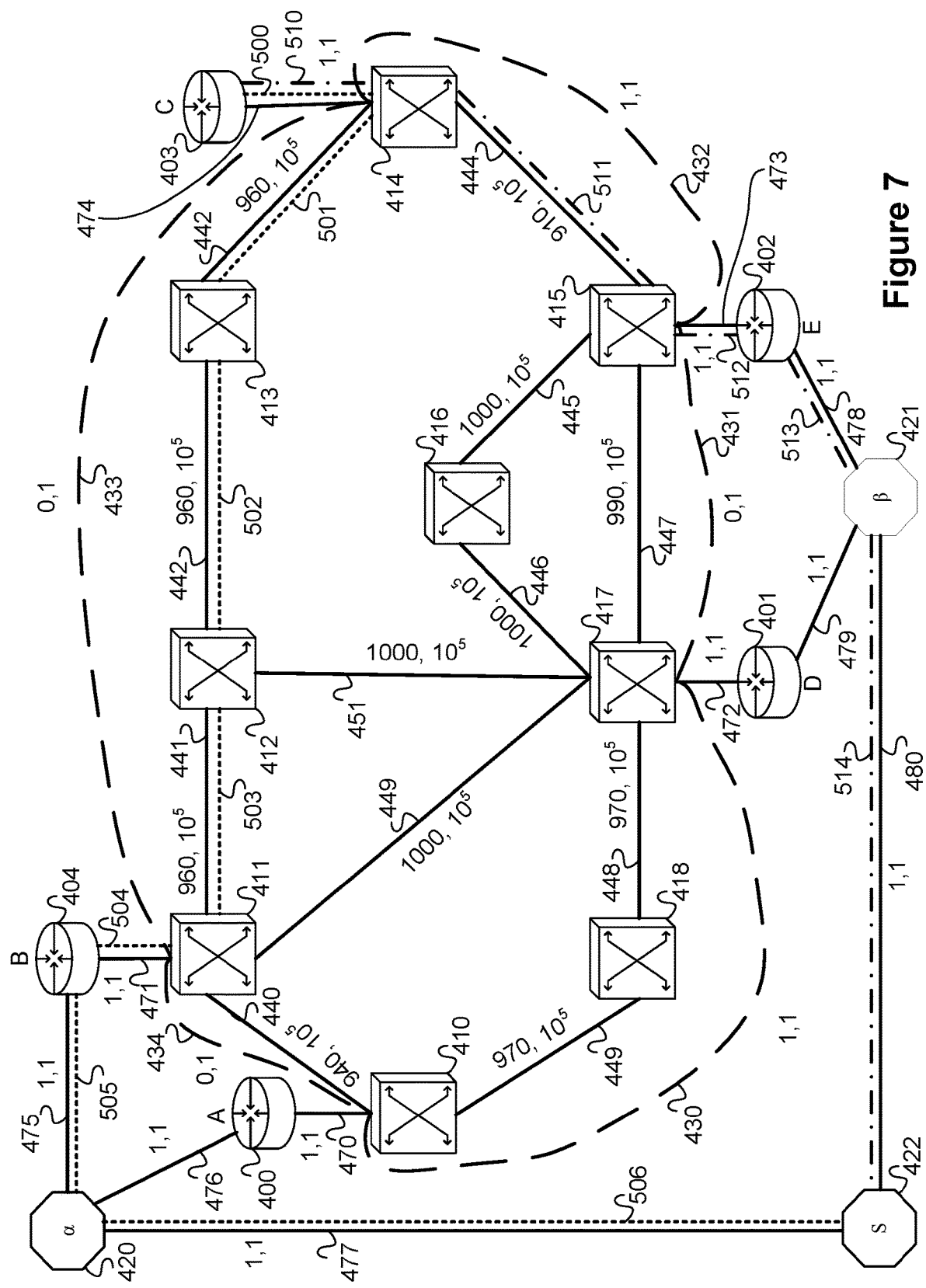
FIG. 7 illustrates a network where VN nodes map to a plurality of IP network nodes, according to an embodiment.

FIG. 7 illustrates an embodiment where the heuristic embeds the VN illustrated in FIG. 5 on top of the collapsed IP-OTN graph from FIG. 4. VNode 0 is considered to be the start node, and therefore, the start node in this iteration of EK is IP node C. The sink node is meta-node S which is attached to the meta-nodes α and β of VNodes 1 and 2, respectively. Given the maximum demand of VNode 0's incident links is 15, the capacity of each link in the collapsed graph (except links incident to meta-nodes whose capacity is fixed to 1) is replaced by a number of VLinks of capacity 15 it can accommodate. Running EK on the augmented graph returns two flows between the source node C and the sink node S. VLink (0,1) is routed through the first flow returned (the dashed line segments 500, 501, 502, 503, 504, 505, and 506) which is OTN links which creates a new IP link (B,C) with capacity 20. Therefore, to meet the cost constraint, EK can only route VLink (0,2) via the second flow returned (the dash-dot-line segments 510, 511, 512, 513, and 514) which is existing IP links. By examining the terminating IP nodes in every flow, VNode embedding of nodes 1 and 2 are identified as IP nodes B and E, respectively.

Figure 8:
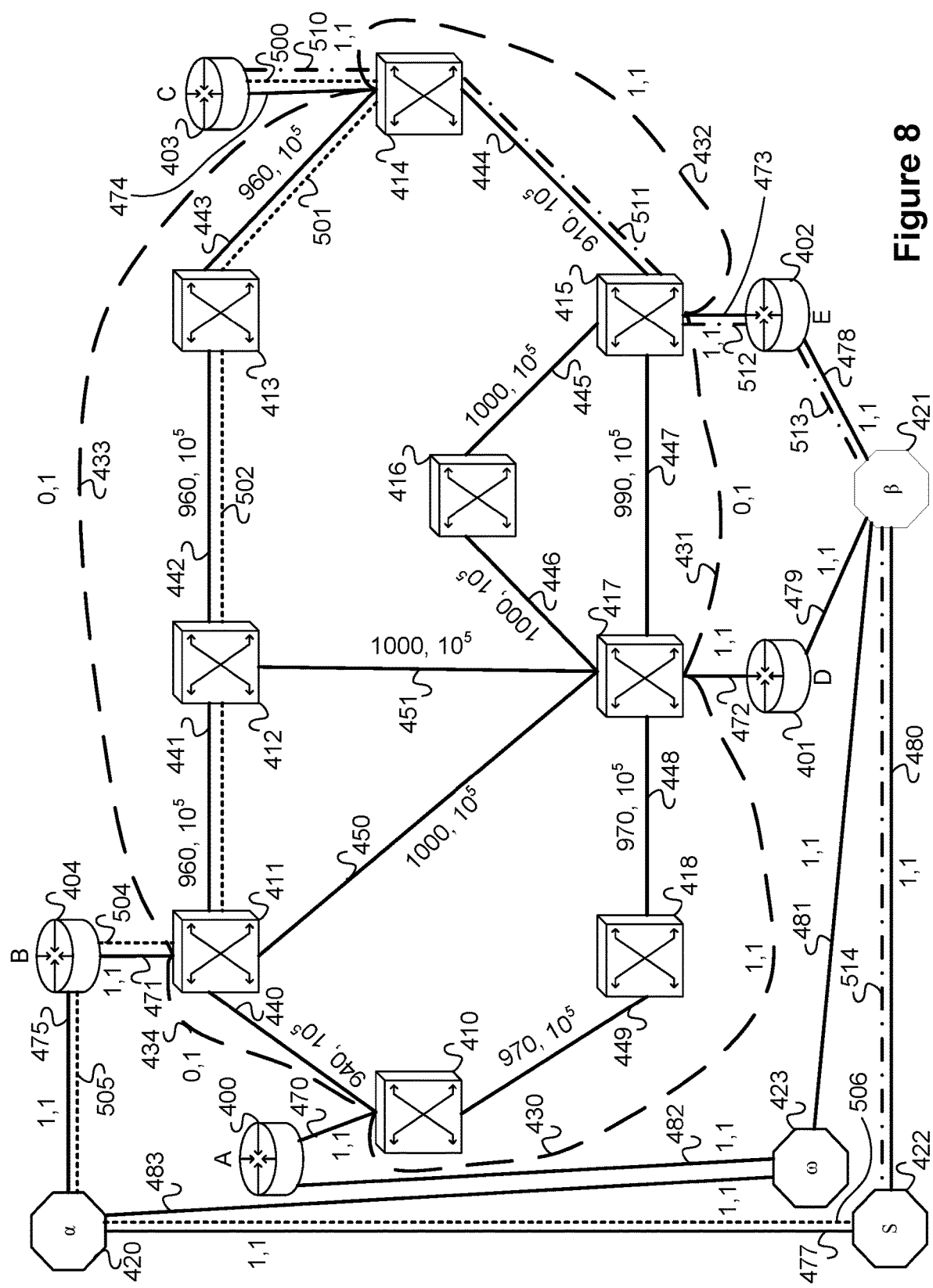
FIG. 8 illustrates the mapping of a single VN node to a single IP node when VN nodes map to a plurality of IP nodes, according to an embodiment.

FIG. 8 illustrates an embodiment where a Referee node is added to uniquely decide the outgoing direction of an incoming flow from an IP node. As a result, the last IP node of such a flow carrying path gives the VN node embedding.

Going back to algorithm illustrated in FIG. 6, the joint node and link embeddings are executed iteratively on a subgraph of the VN until all the VNodes are settled. This iterative scheme can render a sub-optimal solution. However, performing joint node and link embedding on the entirety of the VN in a single iteration generates an optimal solution. This form of embedding is possible when all nodes in the VN are only connected to a single node, and if the latter is selected as the start node which is obtained when the VN topology is a star. A star VN topology S(N) contains a center node u" and N links connecting u" to N leaf nodes {$v_1"$, $v_2"$, ... $v_N"$}. If the central node, u", has more than one candidate node in its location constraint set, then running the algorithm illustrated in FIG. 8 $|\mathcal{L}_u v"|$ times is sufficient to obtain the lowest cost mapping solution, and the running time of the algorithm still remains polynomial.

Figure 9:
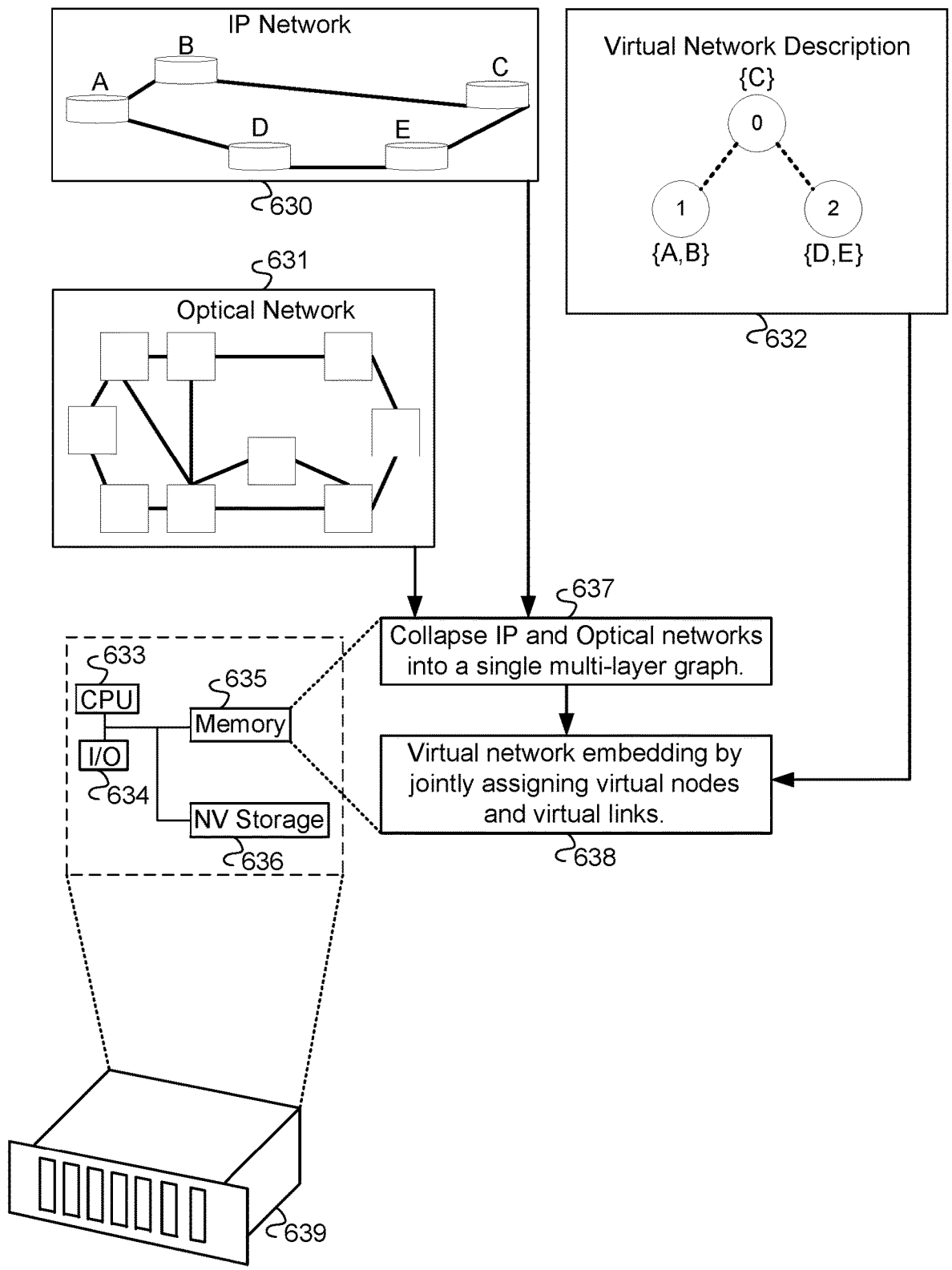
FIG. 9 illustrates a network controller, according to an embodiment.

FIG. 9 illustrates an example network controller 639 which implements the methods discussed herein, according to an embodiment. Network controller 639 includes CPU (633), I/O (634), and Non-Volatile (NV) storage (636). The NV storage 636 includes machine readable instructions, which when executed by the processor 633, cause the network controller to implement the methods discussed herein. For example, the network controller 639 collapses the IP substrate (630) and the optical substrate (631) to create a collapsed IP-OTN graph at step 637. The network controller also receives VN request 632. The VN (632) is then embedded on top of the IP-OTN graph in the system's memory (635). The network controller then performs the virtual network embedding 638 by jointly determining the assignment of virtual nodes and virtual links. It is noted that this is described as jointly to clarify that Virtual nodes and Virtual links are embedded to a multi-layer network simultaneously and not sequentially. As discussed in some embodiment the network controller implements a heuristic solution as described above with reference to FIG. 8. For example, Virtual network embedding is executed for a multilayer network whereby the mapping of the virtual network to both the IP layer and the OTN layer are available as an integrated solution with topological flexibility in the IP layer. In some embodiments the IP-to-OTN is not predetermined for new IP links and that these mappings are also determined during the course of execution of the algorithm.

In some embodiments the network controller of FIG. 9 can interface with a network entity which instantiates the virtual nodes based on placement decisions made by the network controller 639. In some embodiments, such network entity can include Network Function Virtualization (NFV) MANagement and Orchestration (MANO), for example as described by the European Telecommunications Standards Institute (ETSI). In some embodiments the network controller can also interface with a network entity for allocating the virtual links based on placement decisions made by the network controller 639. In some embodiments, the network controller 639 can include functionality to instantiate the virtual nodes and/or establish the virtual links.

The heuristic has been evaluated through simulation. The evaluation was performed based on the comparison of costs between the optimal ILP formulation and the heuristic to evaluate how well it compares to the optimal.

The test-bed used in the simulation setup compared the performance of the optimal ILP formulation and the heuristic using IBM ILOG CPLEX 12.5 C++ libraries and Java, respectively. The optimal ILP formulation was run on a machine with 4×8 core 2.4 GHz Intel Xeon ES-4640 CPU and 512 MB of memory, whereas, we used a machine with 2×8 core 2 GHz Intel Xeon E5-2650 CPU and 256 GB memory to evaluate the heuristic.

The random graphs for both SN and VN were synthetically generated. The generated OTNs varied in size between 15-100 nodes. For each OTN, an IP topology was generated with a node count of 60% of that of the OTN and a link generation probability chosen to match the average nodal degree of known ISP topologies. OTN links were assigned a capacity of 100 Gbps, while IP links were assigned a random capacity between 10-20 Gbps. For each combination of IP and OTN, 20 VNs were generated with 4-8 VNodes and a 0.5 probability of having a link between every pair of VNodes.

The evaluation metrics were the cost ratio and the execution time. The cost ratio is the ratio of costs obtained by two different approaches for solving the same problem instance. Cost is computed using equation 14 and measures the relative performance of two approaches. The execution time metric is the time required for an algorithm to solve one instance of the optimal or heuristic method.

Figure 10:
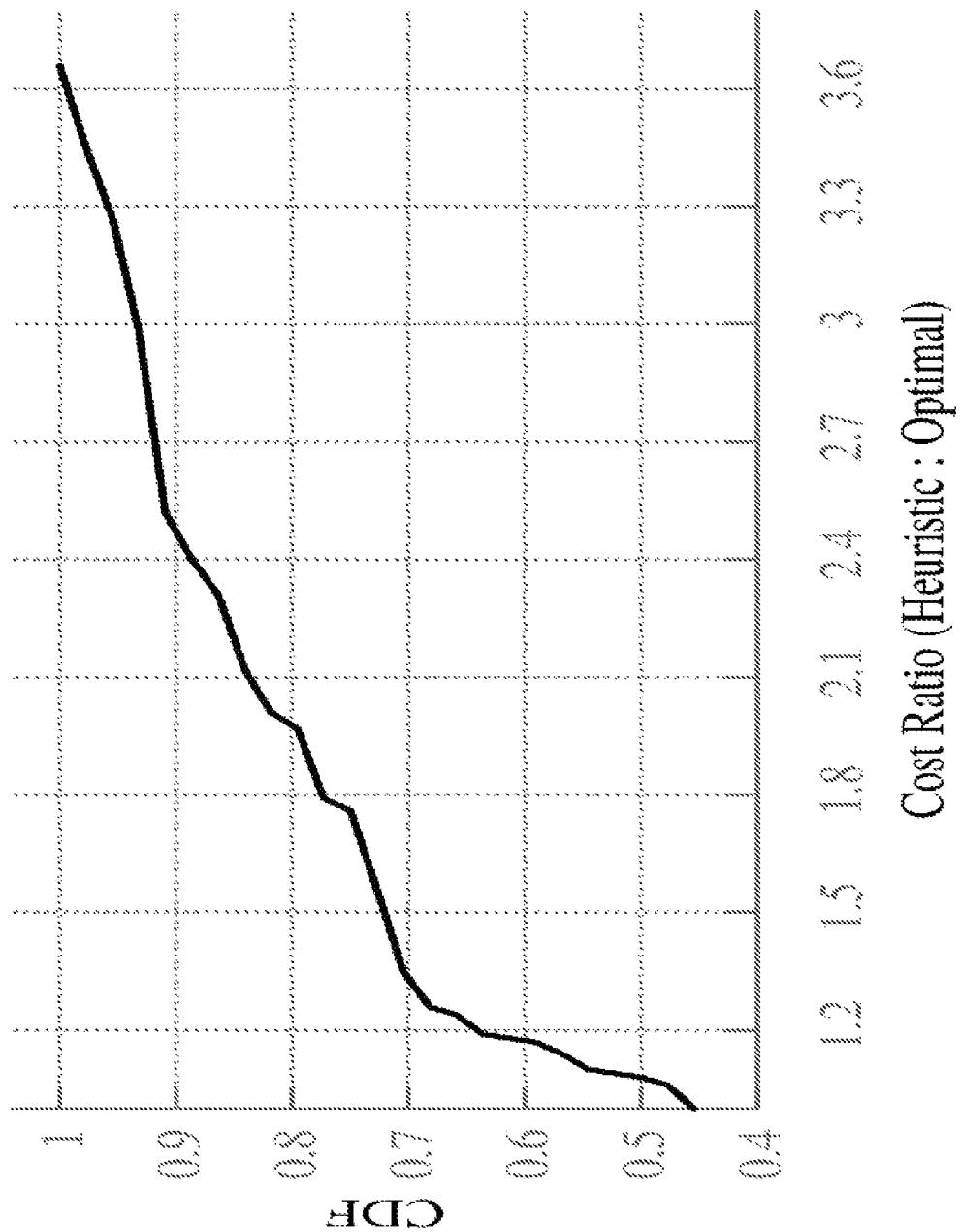
FIG. 10 illustrates the cost ratio for the heuristic to optimal.
Figure 11:
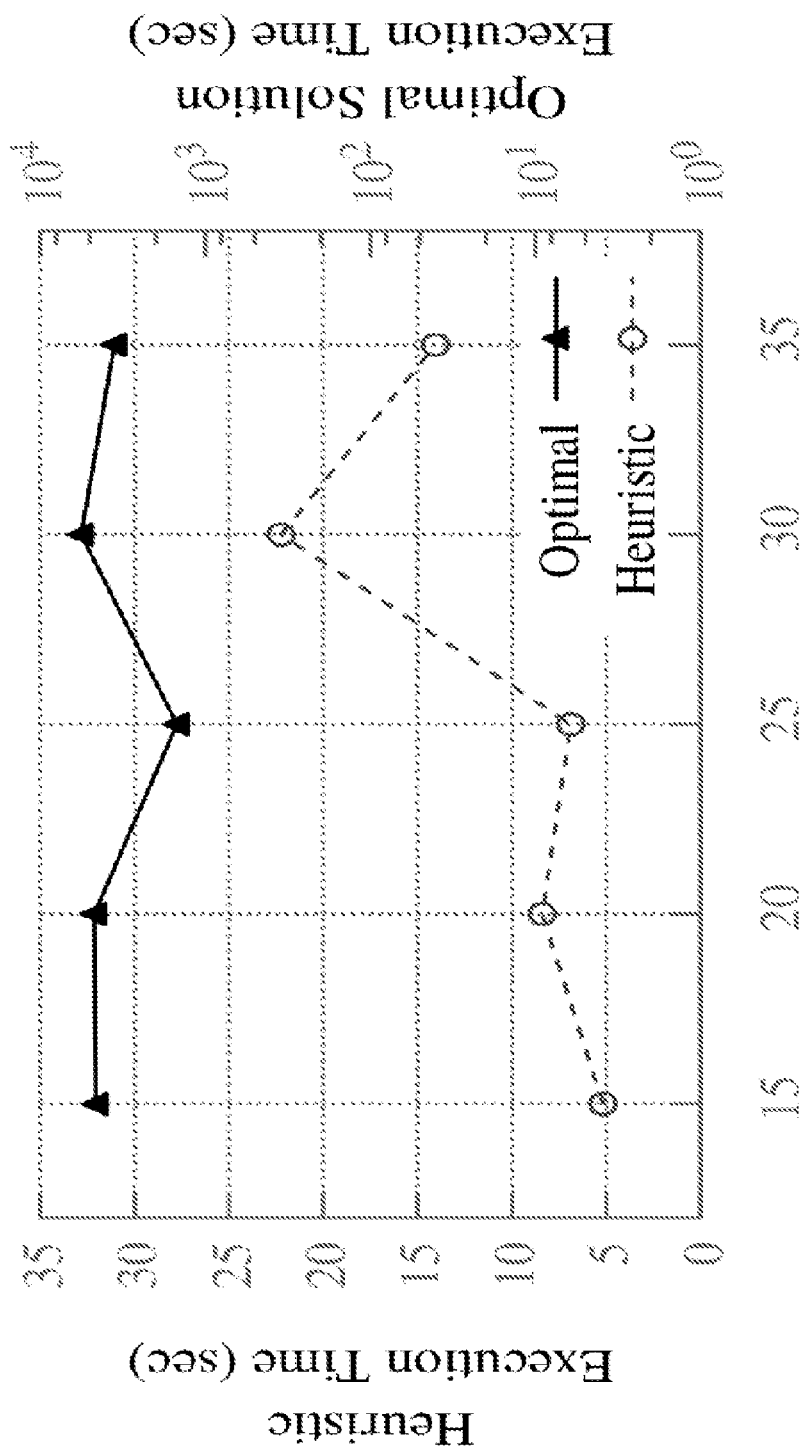
FIG. 11 illustrates the comparison of execution time for the heuristic to optimal.

FIG. 10 illustrates the results of the cost ratio evaluation between the heuristic and the optimal. The first step of this evaluation is to measure the extent of the additional resources allocated by the heuristic compared to the optimal. The cost function is proportional to the total bandwidth allocated for a VN and the new IP links. Therefore, cost ratio of heuristic to optimal gives the extent of additional resources allocated by the heuristic. FIG. 11 shows the Cumulative Distribution Function (CDF) of cost ratio between the heuristic and optimal. Note that optimal scaled up to only 35-node OTN. To mitigate the impact of VNode ordering during embedding, the heuristic was run 75 times, each time with a different VNode embedding order and takes the best solution at the end. It was observed from the results that 50% of the VNs admitted by the heuristic have an embedding cost within 10% of the optimal. On average, the admitted VNs have a cost within 1.47× of the solution provided by the optimal approach. The heuristic achieved these results while executing 440× faster than the optimal on average (10 s for heuristic vs. more than an hour per VN for optimal).

FIG. 11 illustrates the advantage of the heuristic compared to the optimal in terms of runtime. FIG. 11 illustrates the execution times plotted against varying SN size. For similar problem instances in the evaluation, the optimal executed 200× to 900× faster than the optimal. Even after increasing the SN size, the execution time of the optimal remained in the order of tens of seconds.

Figure 12:
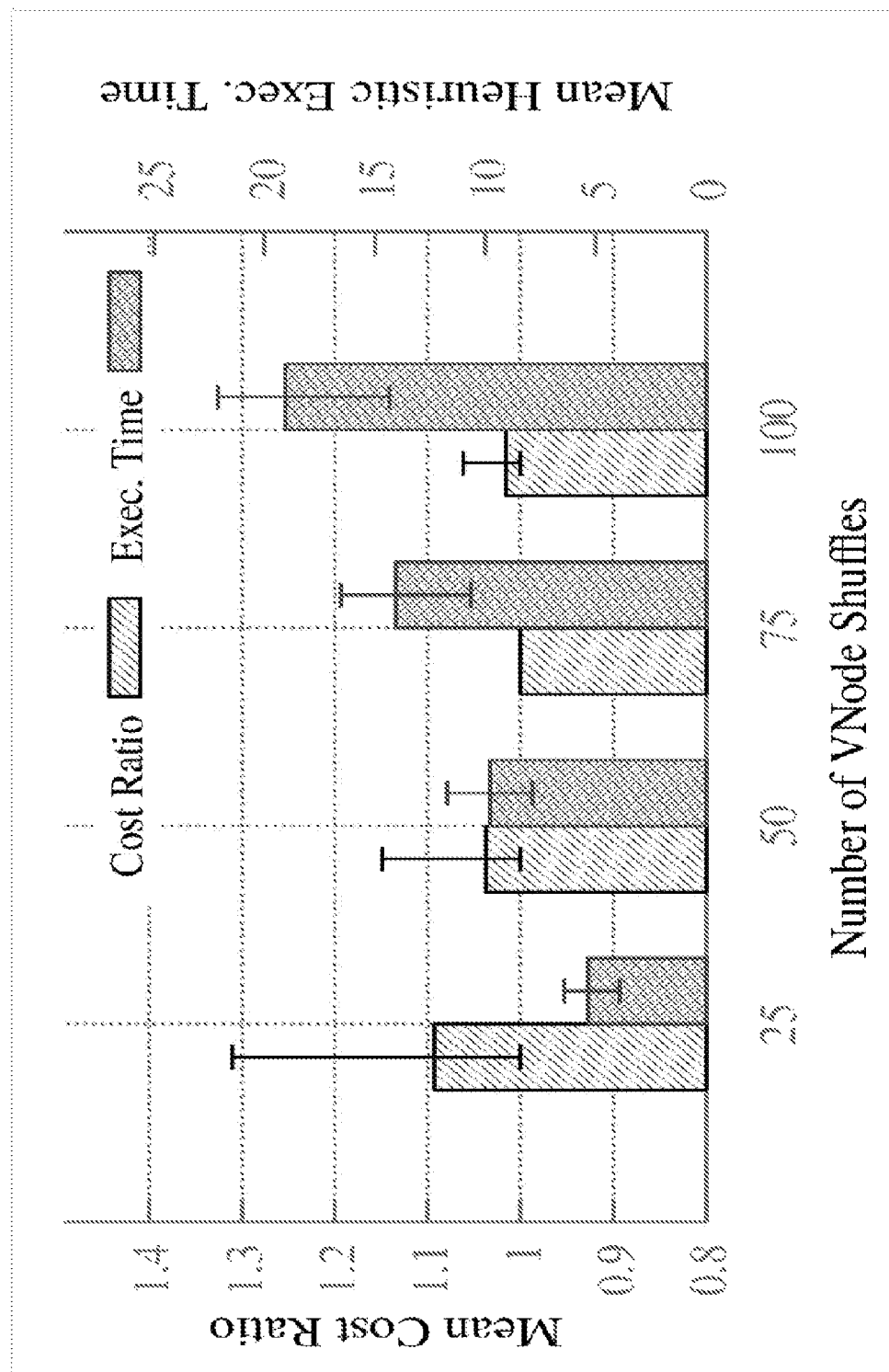
FIG. 12 illustrates the trade-off between cost ratio and execution time for the heuristic.

FIG. 12 illustrates the trade-off between Cost Ratio and Execution Time. The impact of the number of VNode orderings considered for embedding was evaluated and illustrated in FIG. 12. FIG. 12 shows how increasing the number of considered VNode orderings impacts the cost ratio and the execution time of the heuristic. Clearly, as the number of considered VNode offerings is increased, the heuristic to the optimal's cost ratio decreases. This comes at the expense of increased execution time, which still remains in the order of tens of seconds. However, the gains become marginal as 75 iterations is exceeded. Hence, the evaluation opted for feeding the heuristic with 75 VNode orderings and selected the best solution.

It should be appreciated that while example embodiments have been discussed herein utilizing the example of an IP over OTN multi-layer substrate network, the principles discussed herein can be extended for other multi-layer substrate network. As but one example, the principles discussed herein can be extended to other IP over optical networks such as IP over DWDM. However to do so, it should be appreciated by a person skilled in the art that other factors would need to be considered specific to the type of network. For example, for IP over DWDM, aspects such as wavelength selection, wavelength continuity constraints, reach limitations based on data rate would also need to be considered.

Figure 13:
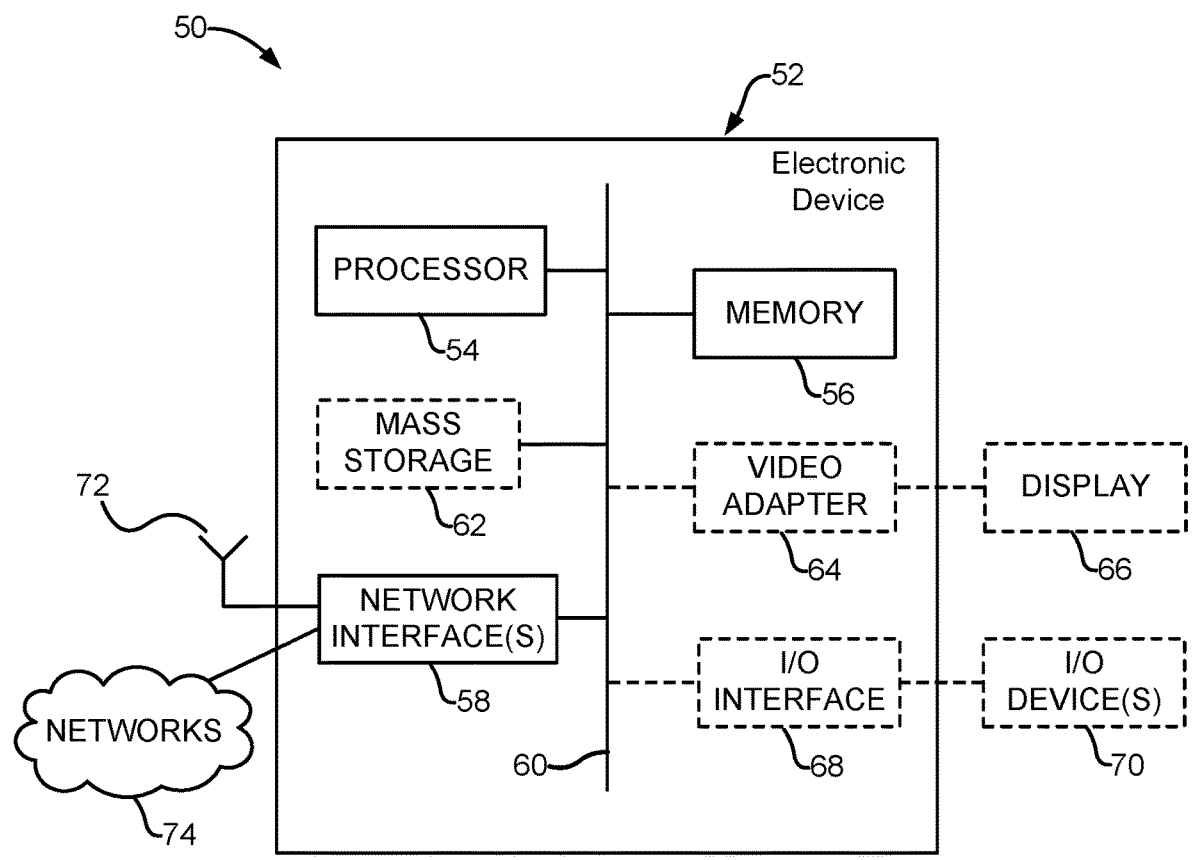
FIG. 13 is a block diagram of an electronic device 52 within a computing and communications environment 50 that may be used for implementing devices and methods in accordance with representative embodiments of the present invention.
Figure 14:
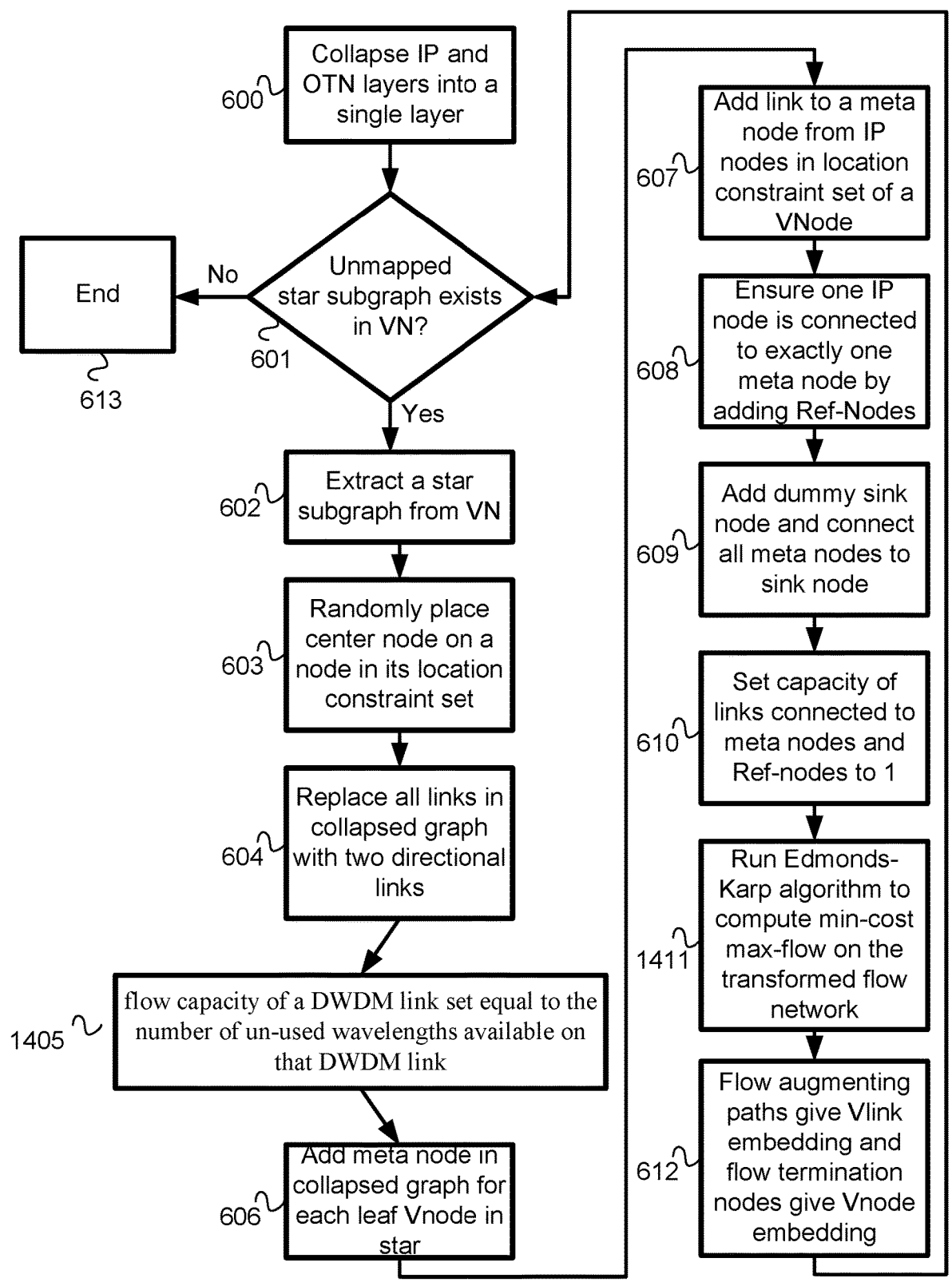
FIG. 14 is a flowchart illustrating a method of a heuristic algorithm that addresses the allocation of Network resources for Virtualization of multi-layer IP-over-DWDM networks, according to an embodiment.

For example, the method discussed above with reference to FIG. 6 for IP over an OTN multi-layer substrate network can be extended for multi-layer IP over a DWDM substrate network as illustrated in FIG. 14, according to an embodiment. However, step 605 from FIG. 6 is replaced with step 1405. In step 1405 the capacity allocation to the links of collapsed graph is as follows: the flow capacity of a DWDM link is set equal to the number of un-used wavelengths available on that DWDM link. This is done to accommodate the fact that most DWDM systems do not support traffic grooming and IP links are mapped to wavelengths on a one to one basis. In step 1411 as EK is executed on the flow graph to obtain the embedding paths, intermediate shortest path computations for EK should consider the availability of a continuous wavelength while finding paths consisting of DWDM links. The remainder of steps are similar to those described above with reference to FIG. 6. These two changes will ensure that discrete wavelength allocation and path continuity constraints imposed by DWDM networks are satisfied FIG. 13 is a block diagram of an electronic device (ED) 52 illustrated within a computing and communications environment 50 that may be used for implementing the devices and methods disclosed herein. In some embodiments, the electronic device may be a controller that includes the collapsed IP-OTN multilayer graph and the mapped VN.

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The electronic device 52 may also include one or more network interfaces 58, which may include at least one of a wired network interface and a wireless network interface. As illustrated in FIG. 4, network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the electronic device 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the electronic device 52 to external input and output devices. Examples of input and output devices include a display 66 coupled to the video adapter 64 and an I/O device 70 such as a touch-screen coupled to the I/O interface 68. Other devices may be coupled to the electronic device 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, electronic device 52 may be a standalone device, while in other embodiments electronic device 52 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each other by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Further non-limiting details can be found in the attached Appendix which forms part of the specification.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of embedding a virtual network onto a multi-layer substrate network, the method comprising:
jointly determining the embedding of virtual nodes and virtual links of the virtual network onto network nodes and network links of the multi-layer substrate network by formulating an objective function which considers cost of the embedding the virtual nodes and the virtual links onto the network nodes and the network links in the multi-layer substrate network;
provisioning each virtual node onto the network nodes in the multi-layer substrate network; and
provisioning the virtual links onto the network links in the multi-layer substrate network.

2. The method of claim 1 wherein the multi-layered substrate network comprises an IP network overlaying an optical network and wherein provisioning the virtual links comprises:
mapping the virtual links onto IP network links.

3. The method of claim 2 wherein jointly determining further comprises creating a new IP network link.

4. The method of claim 3 wherein provisioning the virtual links comprises mapping at least one virtual link to the new IP network link.

5. The method of claim 2 wherein jointly determining further comprises formulating the objective function to minimizes cost of mapping the virtual links to the IP network links.

6. The method of claim 2 wherein jointly determining further comprises formulating the objective function to minimize cost of:
mapping the virtual links to the IP network links; and
mapping any newly added IP network links to optical paths in the multi-layered substrate network.

7. The method of claim 2 wherein jointly determining further comprises formulating the objective function to minimize cost of:
mapping each said virtual node to an IP network node in the IP network according to location constraints associated with each said virtual node;
mapping each virtual link to an IP network link in the IP network, wherein the IP network link can be a newly created IP network link; and
mapping any newly created IP network links to optical paths in the optical network.

8. The method of claim 7 wherein jointly determining further comprises formulating the objective function according to:

$$\sum_{\forall (u',v') \in V'^2} \sum_{i=1}^{p_{u'}} \sum_{\forall (u^*,v^*) \in E^*} z_{u^*v^*}^{u'v'i} \times b_{u'v'i} \times C_{u^*v^*} +$$

$$\sum_{\forall (u'',v'') \in E''} \sum_{\forall (u',v') \in V'^2} \sum_{i=1}^{p_{u'}} x_{u'v'i}^{u''v''} \times b_{u''v''} \times C_{u'v'i}$$

wherein:
v" and E" are sets of virtual nodes (VNodes) and virtual links (VLinks), respectively, each VLink (u", v")∈E having a bandwidth requirement $b_{u''v''}$;
each VNode u"∈V" has a location constraint set to $\mathscr{L}_u$(u")⊂V' that represents a set of IP nodes where u" can be embedded;
bandwidth of an IP link is represented by $b_{u'v'i}$;
mapping between a newly created IP link and an OTN link is $z_{u^*v^*}^{u'v'i}$;
mapping between a VLink (u", v")∈E" and an IP link (u', v', i)∈E' is $x_{u'v'i}^{u''v''}$, and
mapping of each VNode u"∈V" to an IP node is u'∈V';
and C represents cost of allocating 1 unit of bandwidth from a link.

9. The method of claim 7 further comprising minimizing the objective function using integer linear programming.

10. The method of claim 7 further comprising generating a collapsed graph which includes the optical network and the IP network in a single layer.

11. The method of claim 10 wherein generating a collapsed graph comprises:
allocating residual capacity to each link of the collapsed graph; and
allocating a cost for each link of the collapsed graph.

12. The method of claim 11 wherein allocating a cost for each link comprises allocating a higher cost to optical network links than to the IP network links.

13. The method of claim 12 further comprising using a heuristic method to obtain a solution for the objective function, wherein the heuristic method comprises:
transforming the collapsed graph into a flow network; and
determining a collection of flows to use for the flow network by using a min-cost max flow algorithm.

14. The method of claim 13 wherein transforming the collapsed graph into a flow network comprises:
extracting a star shaped sub-graph from the virtual network; and
replacing all links in the collapsed graph with two directed links that allow traffic to flow in one direction.

15. The method of claim 14 further comprising:
for each star shaped sub-graph, randomly assigning an IP node as a center node based on location constraints;
adding a meta-node for each leaf node in the star shaped sub-graph that is connected via a directed link to each IP node in the sub-graph that belongs to the location constraint of a given virtual node; and
setting capacity of the directed links that connect each IP node to a meta-node to one.

16. The method of claim 15 further comprising setting the capacity of the directed links that are not connected to any meta node according to:

$$\frac{b_{uv}}{\max\_\{\text{links in star}\}(b_{u''v''})}$$

wherein bandwidth of an IP link is represented by $b_{u'v'i}$.

17. The method of claim 15 further comprising:
adding a dummy sink node; and
connecting the meta-nodes to the dummy sink node.

18. The method of claim 15 further comprising the addition of Referee-nodes to ensure only one IP node is connected to exactly one meta-node.

19. The method of claim 15 further comprising setting the capacity of links connected to meta-nodes and Referee-nodes to 1.

20. The method of claim 13 wherein determining a collection of flows to use for the flow network by using a min-cost max flow algorithm comprises the execution of an Edmonds-Karp algorithm to compute minimum-cost maximum-flow on the transformed flow network.

21. The method of claim 20 further comprising:
converting flow augmenting paths into embedded virtual links; and
converting flow termination nodes into embedded virtual nodes.

22. A network controller comprising:
a network interface;
a processor;
machine readable memory storing machine executable instructions which when executed by the processor causes the network controller to:
jointly determine the embedding of virtual nodes and virtual links of a virtual network onto network nodes and network links of a multi-layer substrate network by formulating an objective function which considers the cost of the embedding the virtual nodes and the virtual links onto the network nodes and the network links in the multi-layer substrate network;
provision each virtual node onto the network nodes in the multi-layer substrate network; and
provision the virtual links onto the network links in the multi-layer substrate network.

23. The network controller of claim 22 wherein the multi-layered substrate network comprises an IP network overlaying an optical network and wherein the instructions which cause the network controller to provision the virtual links comprises instructions to map the virtual links onto IP network links.

24. The network controller of claim 23 wherein the instructions which cause the network controller to jointly determine further comprises instructions to cause the network controller to formulate the objective function for minimizing the cost of:
mapping each said virtual node to an IP network node in the IP network according to location constraints associated with each said virtual node;
mapping each virtual link to an IP network link in the IP network, wherein the IP network link can be a newly created IP network link; and
mapping any newly created IP network links to optical paths in the optical network.

* * * * *